March 8, 1932.  C. S. BRAGG ET AL  1,848,413
CONTROLLING VALVE MECHANISM FOR VACUUM BRAKE SYSTEMS
Filed June 20, 1930  3 Sheets-Sheet 1
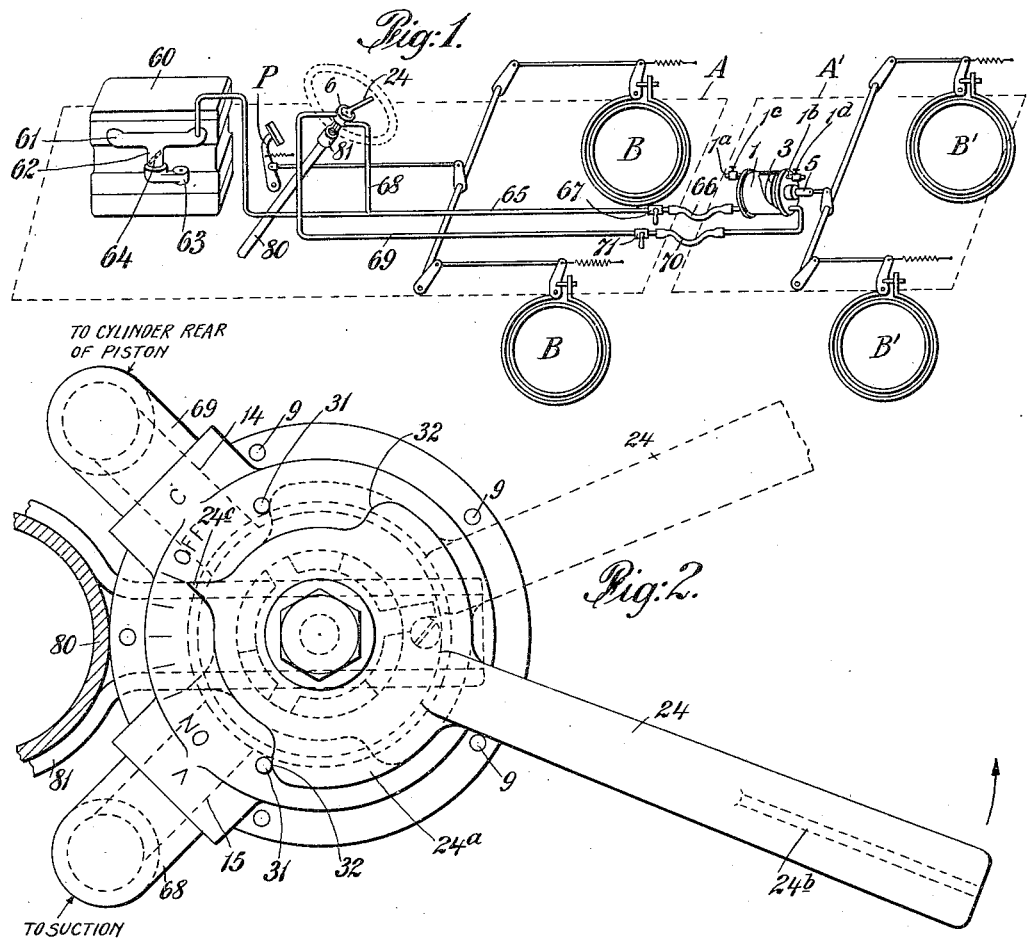
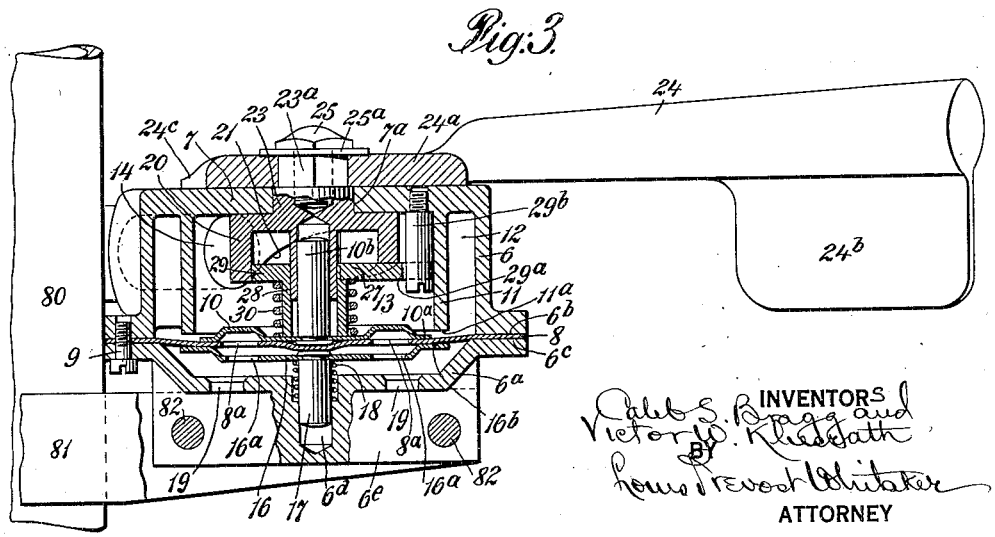

March 8, 1932. C. S. BRAGG ET AL 1,848,413
CONTROLLING VALVE MECHANISM FOR VACUUM BRAKE SYSTEMS
Filed June 20, 1930  3 Sheets-Sheet 2
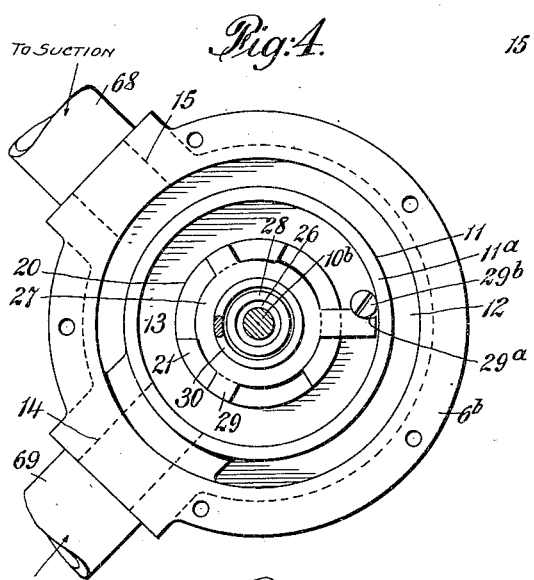
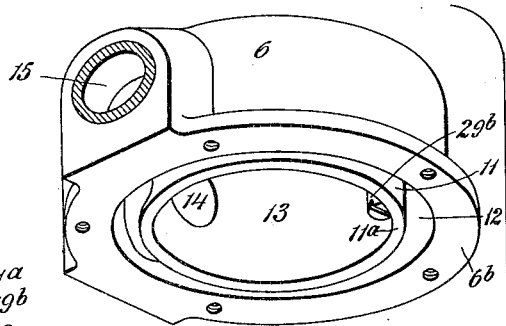
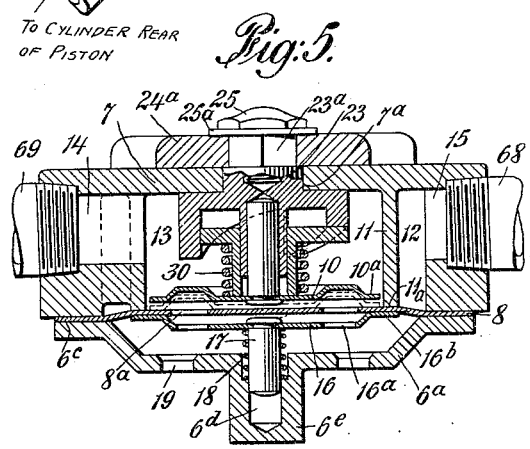
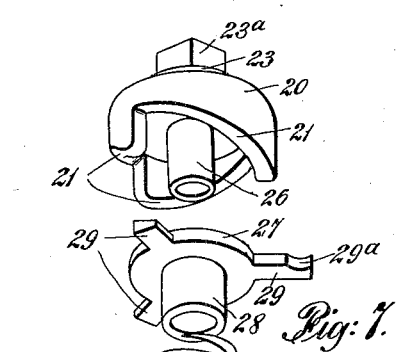
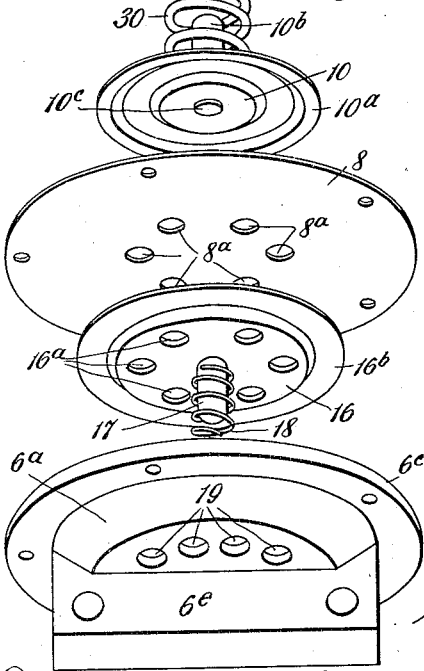
INVENTORS
Caleb S. Bragg
Victor W. Kliesrath
BY
Louis Frost Whitaker
ATTORNEY March 8, 1932.   C. S. BRAGG ET AL   1,848,413
CONTROLLING VALVE MECHANISM FOR VACUUM BRAKE SYSTEMS
Filed June 20, 1930   3 Sheets-Sheet 3
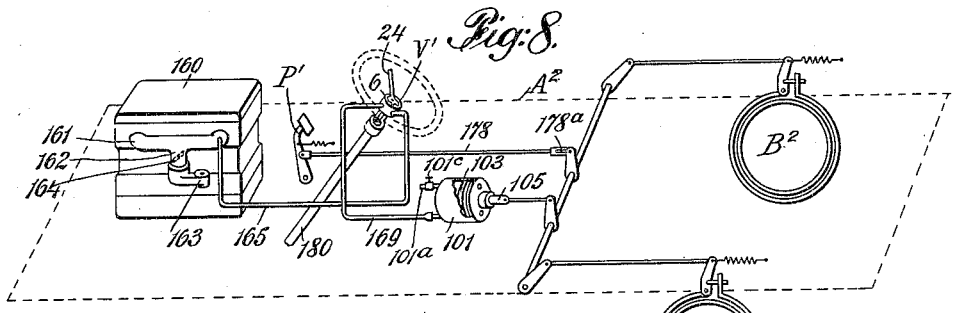
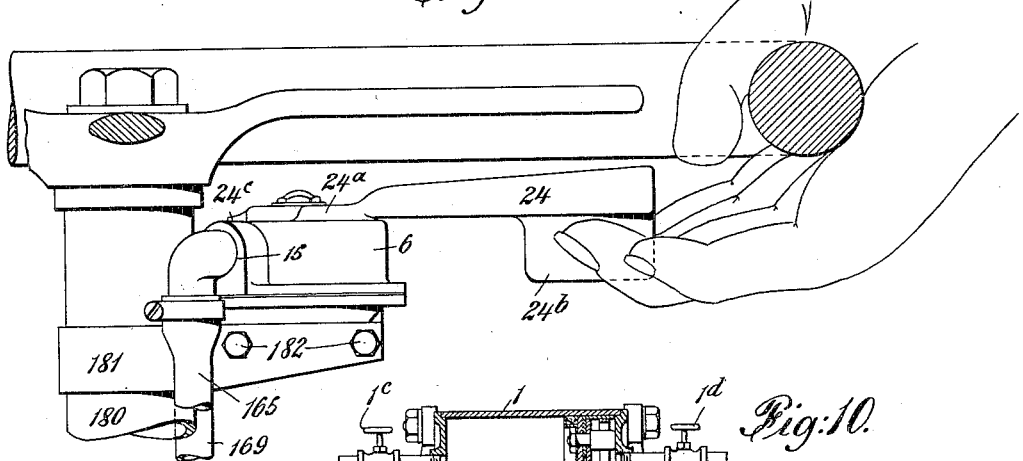
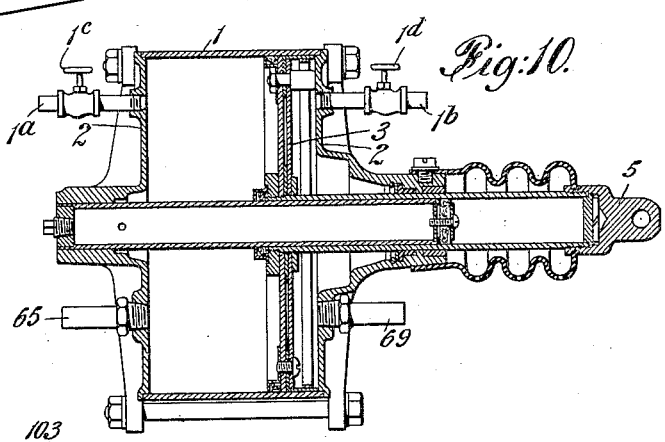
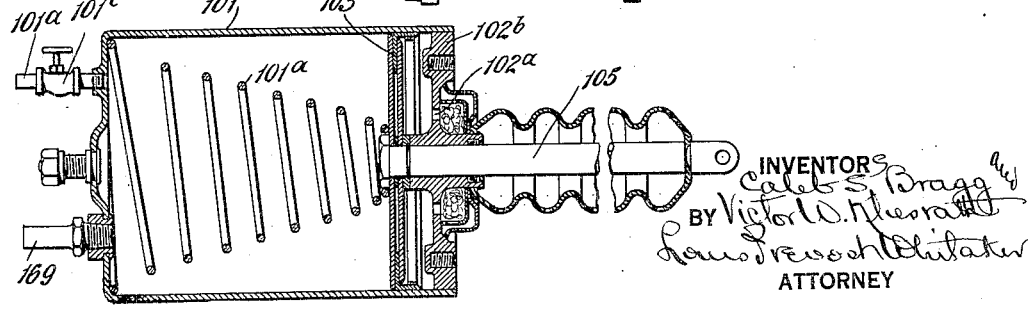

Patented Mar. 8, 1932

1,848,413

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

CONTROLLING VALVE MECHANISM FOR VACUUM BRAKE SYSTEMS

Application filed June 20, 1930. Serial No. 462,491.

Our invention consists in the novel features hereinafter described, reference being had to the accompanying drawings which show one embodiment of the invention selected by us for purposes of illustration, and the said invention is fully disclosed in the following description and claims.

Our present invention consists in a controlling valve mechanism for controlling servomotors operated by a differential of fluid pressures, and particularly adapted for the control of vacuum brake systems for automotive vehicles, in which the lower fluid pressure is a partial vacuum conveniently obtained by a connection to the intake manifold or other portion of the suction passage of an internal combustion engine employed for propelling the vehicle or vehicles, between the throttle valve and the engine cylinders, and the higher fluid pressure is ordinarily atmospheric pressure.

The valve mechanism is preferably operated by a hand lever movable into position to connect a portion of the power actuator between relatively movable parts thereof with suction or with higher fluid pressure, and the valve mechanism is capable in any intermediate position of automatically disconnecting said portion of the actuator from both suction and higher fluid pressure to hold the brakes as applied, and will automatically reconnect said portion of the cylinder to the source of suction or higher fluid pressure to maintain the brakes as applied should any leaks tend to change the differentials of pressures during long applications of the brakes. The valve mechanism is capable of controlling a servo-motor or power actuator of the pressure balanced type, in which the piston is exposed to the higher fluid pressure on both faces when in the released position, and also to control a servo-motor or power actuator of the vacuum balanced type, in which the piston is exposed on both faces to vacuum or lower fluid pressure, without any change in the mechanism of the valve, it being understood that the "on and off" positions of the valve mechanism in one case will be the reverse of the "on and off" positions in the other case. This enables us to use the same parts in assembling the valve mechanism and carrying one type of valve mechanism in stock, for controlling either type of actuator, the only difference being, in practice, the placing of the indications for the "on and off" positions of the valve actuating lever with respect to a suitable pointer carried thereby. This valve mechanism is especially adapted to control certain brake mechanisms which cannot conveniently be connected with or operated by the ordinary brake pedal, as for example, the brakes of trailers, which should be applied in proportion to the load carried by the trailer, which load may vary considerably from the load carried by the tractor, and furthermore the load carried by the trailer may more than exceed the weight of the trailer when empty, so that the variation between the loads carried by the tractor and trailer varies considerably from their weights when empty.

The valve mechanism also provides means whereby the effective stroke of the servomotor or power actuator may be applied gradually or step by step, and will automatically regulate the power of the actuator to a degree commensurate with the relative movement of the hand operated lever between the extremes of the "on and off" positions.

The valve mechanism is very compact and is enclosed entirely within a casing, preferably cylindrical, which can be conveniently mounted within reach of the operator of any automotive vehicle. It has been found extremely convenient to support it upon and closely adjacent to the steering column, below the steering wheel, and to have the hand operated lever of such length as to extend from the valve casing to a point adjacent to the rim of the wall, so as to permit it to be operated without removing the hand from the wheel, and the operating lever is preferably provided with a depending blade which can be conveniently gripped between the fingers of the operator, or projected into a mitten or heavy glove, while the palm of his hand engages the wheel rim to facilitate the operation of applying the brakes without removing the hand from the wheel.

Our invention also comprises certain novel features of construction and combination of parts hereinafter fully disclosed and particularly pointed out in the claims.

Referring to the accompanying drawings,

Fig. 1 is a diagrammatic view illustrating a vacuum brake system applied to a trailing vehicle and operated by a vacuum balanced power actuator controlled by our improved valve mechanism, which is located on the tractor vehicle and supported from the steering column thereof.

Fig. 2 is a top plan view of the valve mechanism, a portion of the steering column being shown in section.

Fig. 3 is a vertical sectional view through the valve mechanism showing the steering column and supporting bracket, parts being shown in elevation, the valve mechanism being illustrated in Fig. 1 or 2.

Fig. 4 is a bottom plan view of the upper portion of the valve casing with the lower member removed.

Fig. 5 is a sectional view of the valve mechanism when the hand lever is in an intermediate position, the air inlet valve being open and the suction valve closed, dotted lines indicating the closed position of the air inlet valve under automatic action.

Fig. 6 is a similar view showing the air inlet valve and parts when in the fully opened position.

Fig. 7 represents the several parts of the valve mechanism exclusive of the operating hand lever in separated relation.

Fig. 8 is a diagrammatic view of a vacuum brake installation on an automotive vehicle, including a pressure balanced actuator operatively connected with a controlling valve, which is again shown supported on the steering column.

Fig. 9 is an enlarged detail view showing the preferred relation between the valve operating lever and steering wheel.

Fig. 10 is an enlarged detail sectional view of the vacuum balanced actuator illustrated in Fig. 1.

Fig. 11 is a similar sectional view of the pressure balanced actuator illustrated in Fig. 8.

The casing of our valve mechanism is preferably formed in two members, indicated at 6 and $6^a$. The member, 6, comprises a cylindrical shell closed at its upper end by a plate, 7, and provided interiorly with an annular seat member, 11, having an annular seat, $11^a$. The annular seat member, 11, divides the space within the chamber into a central chamber, 13, which communicates with a radial passage, 14, extending through the outer shell of the casing and separated from the substantially annular chamber, 12. The annular chamber, 12, which is usually termed the suction chamber, communicates with a radial passage, 15, extending through the outer shell. The passages, 14 and 15, may be threaded or otherwise constructed to receive pipe connections as hereinafter explained. The closed top, 7, of the cover member, 6, is provided with a central aperture, indicated at $7^a$. The members, 6 and $6^a$, of the casing are provided with annular clamping faces, indicated at $6^b$ and $6^c$, respectively to engage marginal portions of a diaphragm, indicated at 8, and the members of the casing are clamped together upon the diaphragm in any suitable manner, in this instance by means of screws, one of which is indicated at 9 in Fig. 3. The diaphragm is supported in close relation to the seat, $11^a$, of the seat member, 11, so that it can be deflected into and out of seated position with respect thereto. The diaphragm is also provided with air inlet apertures, indicated at $8^a$. When seated, the diaphragm will separate the annular suction chamber, 12, from the central chamber, 13, and when in the unseated position, the suction chamber, 12, will be connected with the central chamber, 13. For the purpose of insuring the seating of the flexible diaphragm, 8, when relieved of pressure upon its inner face, we conveniently provide a seating disc, 16, which is carried by a stem, 17, capable of sliding in a recess, $6^d$, in the casing member, $6^a$, and pressed upward by a spring, 18, surrounding said stem. The seating disc is provided with annular portions, $16^b$, for engaging the portion of the diaphragm opposite the seat, $11^a$, and said disc is also provided with air inlet apertures, indicated at $16^a$. The bottom plate of the casing member, $6^a$, is also provided with air inlet apertures, 19. Within the central chamber, 13, is located an operating cam, 20, shown in detail in Fig. 7. This cam is substantially cylindrical and is provided with the cam grades, 21, 21, 21, in this instance three in number. The cam, 20, is rotatably mounted in the upper member, 6, of the casing by means of a stem, 23, which extends through the aperture, $7^a$, in the top plate, 7, and the upper portion, $23^a$, of the stem, 23, is preferably made polygonal in cross section, (in this instance it is shown square), to engage a correspondingly shaped aperture in the plate portion, $24^a$, of the hand operating lever, 24, to which it is conveniently secured by means of the cap screw, 25, and washer, $25^a$. The cam is provided within the chamber, 13, with a depending hollow sleeve, indicated at 26.

27 represents an adjustable abutment disc having a guiding sleeve, 28, engaging the sleeve, 26, of the cam, 20, and movable vertically with respect thereto, said disc being provided with radial arms, 29, for engaging the cam grades, 21, of the radial cam. Means are provided for holding the abutment disc against rotation with the cam, and in this instance we have shown one of the arms, 29, of greater length than the other, and provided with a notch or recess, $29^a$, (see Figs. 3 and 7)

to engage a part fixed with respect to the casing, provided in this instance by means of a stud, 29<sup>b</sup>, screwed into a threaded opening in the top of the casing member, 6, in position to be engaged by the notch, 29<sup>a</sup>. Below the lower end of the sleeve, 28, we provide a vertically movable disc valve, 10, having an annular seat portion, 10a, for engaging portions of the diaphragm outside of the air inlet apertures, 8a, therein. This disc valve is provided centrally with a guiding stem, 10b, which has a guiding engagement with the interior of the sleeve, 25, of the cam, thus holding the disc valve centrally with respect to the diaphragm and chamber, 13, while permitting it to move vertically. The disc valve, 10, is also provided with a central projection, 10c, for engaging the diaphragm and tending to hold the disc valve unseated, when the spring pressure on the disc valve is relieved. This projection is provided in this instance by a portion of the stem, 10b, which extends through a hole in the disc valve and is riveted over the edges of the same. Between the disc valve, 10, which may be termed the atmospheric valve, and the abutment disc, 27, is a coiled spring, indicated at 30, heavier than the spring, 18, before referred to. This resistance spring, 30, surrounds the sleeve, 28, of the abutment disc and exerts a downward pressure on the disc valve, 10. This spring, 30, also exerts an upward pressure on the cam, 20, holding the upper surface of cam, 20, in sealing contact with portion of the casing, 6, to prevent leakage of air through the aperture, 7a, and a leather or cork washer may be provided between these surfaces if desired.

It will be understood that by swinging the hand lever, 24, around its pivotal axis, the cam, 20, will be rotated in a direction to cause a sliding movement of the cam grades, 21, with respect to the arms, 29, of the abutment disc, 27, and thereby either compress or relieve the resistance spring, 30, according to the direction of movement of the handle, 24. When the spring is compressed to its fullest extent, as shown for example, in Fig. 3, the lower end of the sleeve, 28, of the abutment disc will be in contact with the disc valve, 10, holding it seated upon the diaphragm, and holding the diaphragm unseated from the seat, 11a, and the seating disc, 16, depressed, as clearly shown in Fig. 3. This will connect the suction chamber, 12, with the central chamber, 13, of the valve casing, so that the upper face of the diaphragm and disc valve will be exposed to vacuum, while the lower face thereof is exposed to air, in which condition there is the maximum differential of fluid pressures on the valve parts, 8 and 10. The resistance spring, 30, is so calibrated that in its fully compressed condition, shown in Fig. 3, it will a little more than counterbalance the differentials of pressures on the atmospheric valve, 10, as the handle is moved to lift the projection, 28, to permit the diaphragm, 8, to seat. As the degree of vacuum in an internal combustion engine of an automotive vehicle is relatively constant, this spring can be so calibrated. In the fully relieved condition, indicated in Fig. 6, even if the differentials of fluid pressures on the disc valve, 10, are equal, spring, 30, will not exert sufficient force on the disc valve to flex the diaphragm, as shown in Fig. 3, or to compress the light spring, 18, and therefore cannot seat the disc valve, 10.

We will now explain the operation of the valve in controlling a power actuator of the vacuum balanced type, referring particularly to the diagram illustrated in Fig. 1. In this figure we have indicated in dotted lines a tractor vehicle, A, and a trailer vehicle, A', which is connected therewith in any usual or desired manner. In this instance we have shown the main vehicle, A, provided with brake mechanisms, indicated at B, of any suitable character, operatively connected with a pedal lever, P, in the usual manner, and operated thereby. We have illustrated the brake mechanisms, B', B', on the trailer connected for operation by the piston, 3, of a power actuator of the vacuum balanced type, having its cylinder, 1, supported on the chassis in any usual manner, and the piston rod, 5, connected through the usual linkage with the brake mechanisms, B'. In Fig. 10 we have illustrated in section a power actuator of the vacuum balanced type, for greater clearness. The cylinder, 1, is closed at its opposite ends by heads, 2, 2, and the piston and piston rod are sealed in any usual or desired manner. The forward end of the cylinder is connected by a suction pipe, 65, with the source of suction, which in this case is the manifold, 61, of the internal combustion engine, 60, for propelling the vehicle. The suction passage of the engine comprises the manifold, 61, and the vertical portion, 62, communicating with the usual carburetor, 63, and provided with the usual throttle valve, 64. The suction pipe, 65, is provided with a flexible portion, 66, between the vehicles, and is also conveniently provided with a cut-off cock, 67, which may be closed when the trailer is not used. The suction pipe is also connected by a branch, 68, with the annular suction chamber, 12, of the valve through the radial passage, 15. The chamber, 13, of the valve casing is connected by the radial passage, 14, and pipe 69, with the cylinder of the actuator in rear of the piston, and this pipe is also conveniently provided with a flexible portion, 70, between the vehicle and a cut-off cock, 71, for closing this passage when the trailer is not used. In this figure we have shown the controlling valve mounted on the steering column, 80, of the tractor vehicle, by means of a clamp, 81, which is secured by bolts or screws, 82, to a depending boss or flange, indicated at 6e, and formed integrally with the casing member, 6a. This clamp can be adjusted around the steering post, so as to bring the hand lever, 24, of the valve mechanism beneath a convenient portion of the wheel, where it will not be touched by the fingers if gripping the wheel, but may be reached by the fingers of the operator in the manner indicated in Fig. 9, for example, so that the valve can be operated without removing the hand from the wheel. We also prefer to provide the outer portion of the handle or lever, 24, with a depending web or plate, 24b, which may rest between two fingers of the operator's hand, even if gloved or mittened, to facilitate the operation of the valve, but this web may be omitted if desired, and the valve can be supported at a lower point on the steering column, or it may be mounted on any other part of the vehicle within reach of the operator, if desired.

In Fig. 2 it will be noted that the plate portion, 24a of the handle is provided with a pointer, 24c, movable over a series of indications on the upper face of the top plate, 7, of the valve casing. Means are provided for causing the handle to remain in any position to which it may be moved between its extremes of movement. This may be accomplished in many ways, but in this instance the plate portion, 24a, of the handle has its lower surface in frictional engagement with the top surface of the plate, 7, and this friction is sufficient to hold the handle in any position to which it is moved. We may also provide stops, indicated at 31, 31, on the top plate, 7, for engaging shoulders, 32, on the handle plate, 24a, to limit the movement of the hand lever, 24, in both directions. In the present instance the position of the hand lever, illustrated in Figs. 2 and 3, is the off or released position when the valve is used for controlling a vacuum balanced actuator, and the indications "on and off" in Fig. 2 are placed thereon as they would be for a valve to be so used.

Assuming that the engine is running and the throttle valve is closed, the air will be exhausted from the cylinder, 1, forward of the piston through the pipe, 65, into the intake manifold, and as the diaphragm, 8, is unseated, the air in the actuator cylinder in rear of the piston will likewise be exhausted through the pipe, 69, chamber, 13, chamber, 12, of the valve mechanism, branch pipe, 68, and suction pipe, 65, so that the piston, 3, of the actuator will be subjected on both sides to vacuum. If it is desired to apply the brakes to a slight extent, the hand lever, 24, will be moved in the direction of the arrow in Fig. 2, which will effect a partial rotation of the cam, 20, in a direction to permit the abutment disc, 28, to be raised by the maximum differentials of pressure on the diaphragm and disc valve and by the springs, 30 and 18, first seating the diaphragm on the seat, 11a, as shown in Fig. 5, after which the pressure of the atmosphere upwardly on the disc valve will unseat it from the diaphragm, as indicated in full lines in Fig. 5, as the collar, 28, moves upwardly and decreases the tension of the spring, 30. The seating of the diaphragm will cut off communication between the actuator cylinder in rear of the piston and the suction line, and the opening of the disc valve will permit air at atmospheric pressure to enter the chamber, 13, and pass through the passage, 14, and pipe, 69, to the actuator cylinder in rear of the piston. Pressure begins to accumulate in rear of the piston and in the chamber, 13, effecting a forward movement of the actuator piston. As the pressure accumulates in the chamber, 13, it reduces the differential of pressures, holding the disc valve open, against the tension of spring, 30, and when the equalization of pressures has proceeded far enough to permit the power of the spring, 30, as the adjusted by the cam, 20, to seat the disc valve, said disc valve will be seated as indicated in dotted lines in Fig. 5, preventing the admission of any further air to the cylinder and arresting the forward movement of the actuator piston. This operation can be repeated by further movements of the hand lever, causing further successive reliefs of the spring, 30, and effecting successive forward movements of the actuator piston until the pressure in the cylinder in rear of the piston and in chamber 13, equals the atmospheric pressure, at which time the spring, 30, will have been sufficiently relieved so that it will not have force enough to flex the diaphragm and close the disc valve, at which time the actuator will be exerting its full power on the brake mechanisms or other apparatus connected therewith. At this time the pointer of the hand lever will have reached the position marked "On". In this position of the parts shown in Fig. 6, the diaphragm will remain seated under the influence of suction in the chamber, 12, and of the light spring, 18, and the disc valve will be held unseated by the engagement of the central projection, 10c, with the diaphragm.

To release the brakes from the fully applied or partly applied position, it is only necessary to move the hand lever and cam, 20, to the off position shown in Figs. 2 and 3, that is, in a direction reverse to that indicated by the arrow, thereby increasing the tension of spring, 30, sufficiently to seat the disc valve on the diaphragm, and then unseat the diaphragm. This will connect the portion of the cylinder in rear of the piston again with suction, causing an equalization of pressures of the actuator on opposite sides of the piston, and withdrawing the air previously admitted, resulting in an instantaneous release of the brake mechanism, and permitting the brake mechanisms (B') connected with the actuator to be withdrawn, and the piston of the actuator to be returned to released position under the action of the ordinary retracting springs for the brake mechanisms. The brake mechanisms may be quickly released by moving the lever, 24, back to the "off" position, and they may be partially or gradually relieved by moving the lever a little at a time in a direction toward the "off" position. Thus, if the lever, 24, is moved only part way toward the "off" position, and stopped at an intermediate point, the resistance spring, 30, will be only partly compressed, and as the air is withdrawn from the chamber, 13, of the valve casing and from the cylinder in rear of the piston, the differential of fluid pressures on the valve parts will increase, and as soon as it becomes sufficient to overcome the resistance of the spring, 30, it will reseat the diaphragm, closing off communication between the actuator cylinder and suction, and stop the further return movement of the piston until the handle is moved further toward the "off" position, to further increase the pressure of the spring, 30.

It will thus be seen that by means of this valve the brakes may be applied gradually and the application stopped, and the brakes held as applied at any point in the stroke of the hand lever, 24, or they may be applied to the full extent of the actuator if the hand lever is swung from the "off" to the "on" position. In like manner the brakes may be released partially, gradually, or altogether, according to the extent of movement of the hand lever toward the off position, and in any intermediate position of the hand lever, the brakes will be held as proportionately applied or released. The valve mechanism will automatically hold the brakes as applied for indefinite periods of time, even though slight leakage of higher or lower pressure should occur, as any change in the differential of pressures on the diaphragm and disc valve will cause one or the other to open to restore the differentials which existed when these valves were first closed.

In Fig. 8 of the drawings we have shown a diagram illustrating a vacuum brake installation in an automotive vehicle, indicated by dotted lines at A2, in which our improved valve is connected with a power actuator of the pressure balanced type, the construction of which is shown in detail for greater clearness in Fig. 11. The parts in Figs. 8 and 11 corresponding with those shown in Figs. 1 and 10 are given the same reference characters with the addition of 100, to avoid repetition. 101 represents the cylinder of the pressure balanced actuator, which is closed at one end by head, 102, the other end being open to the atmosphere through apertures, 102a, in head 102b, provided with means for guiding the piston rod, 104. We have shown a spring, 101a, between the head, 102, and the piston, to assist the return movement of the piston, but this is not essential where the retracting springs for the brake mechanism are sufficient to return the brakes and the piston to released position. As indicated in Fig. 8, the piston rod, 105, is connected to the usual brake linkage, and in this instance we have shown the pedal lever, P', connected by a link, 178, with the brake mechanism, the link, 178, being provided with a slot, 178a, to permit the operation of the brake mechanism by the power actuator, without affecting the pedal. The valve shown in Fig. 8, at V', is the same identical valve which has been described heretofore and will be referred to by the same numerals, the only difference being that the relative positions of the indications "Off" and "On" will be the reverse of that shown in Fig. 2. The forward end of the actuator cylinder, 101, is connected by a pipe, 169, with the passage, 14, of the valve casing leading to the central chamber, 13, thereof. The suction chamber, 12, of the valve casing will be connected through the passage, 15, and suction pipe, 165, with the intake manifold, 161. In the off or released position of the valve mechanism, the handle, 24, will be in the position indicated in dotted lines in Fig. 2, and the valve mechanism will be in the position indicated in Fig. 6, the chamber, 13, being cut off from suction by the seating of the diaphragm, and connected with atmosphere by the unseated disc valve, 10, so that the portion of the cylinder, 101, forward of the piston is in communication with the atmosphere through the valve mechanism, and as the rear face of the piston is always exposed to atmospheric pressure, the piston is submerged in atmosphere or pressure balanced in the released position.

To effect a power stroke of the power actuator shown in Figs. 8 and 11, to apply the brakes, the hand lever, 24, will move in a direction toward the full line position shown in Fig. 2, so as to increase the tension of spring, 30, and cause it to seat the disc valve, 10, and then unseat the diaphragm valve, and thereby connect the actuator cylinder, 101, with the vacuum and exhaust the air therefrom. This will cause a movement of the piston, 103, and the evacuation of chamber, 13, will cause a differential of fluid pressures to build upon the diaphragm and disc valve in opposition to the spring, 30, which will effect the seating of the diaphragm as soon as it overcomes the spring, 30, as then adjusted. The operation of the valve mechanism in applying the brakes with the pressure balanced actuator will be exactly the same as the operation previously described in releasing the brakes connected with the vacuum balanced actuator, and vice versa. In other words, the brakes may be applied gradually and held at any desired pressure until the full power of the actuator is exerted, when the valve mechanism will be in the position indicated in Fig. 3. The brakes may also be released gradually and held at any desired pressure, or they may be applied to the full extent of the power of the actuator or fully released and returned to released position, according to the extent of movement and direction of movement of the lever, 24.

While we have shown the valve mechanism as connected with and controlling one power actuator, it is obvious that the valve mechanism may be connected with and control any number of actuators of the same type by means of suitable pipe connections. As illustrative of this, we have shown in Figs. 1 and 10, for example, the cylinder, 3, provided at its opposite ends with pipes, 1a, and 1b, which may be connected to the corresponding ends of another similar power actuator cylinder (or cylinders), and where these pipes are installed, they may be conveniently provided with cut-off valves, 1c, 1d, as shown, for closing them when not in use. In Fig. 11 we have also shown the closed end of the cylinder, 101, provided with a pipe, 101a, for connecting it with the closed end of another similar actuator cylinder (or cylinders), said pipe being provided with a cut-off cock, 101c, for closing it when not in use.

What we claim and desire to secure by Letters Patent is:—

1. In valve mechanism of the kind described, the combination with a stationary valve casing provided with an annular valve seat forming a central chamber, and an annular suction chamber, means for connecting said suction chamber with a source of suction, and means for connecting said central chamber with a servo-motor between relatively movable members thereof, a diaphragm for engaging said seat to separate said chamber, and provided with air inlet apertures, a disc valve for engaging said diaphragm and closing said apertures, yielding resistance means for engaging said disc valve in a direction to hold the disc valve seated on the diaphragm and the diaphragm unseated, and hand operated means for varying the resistance of said yielding resistance means.

2. In valve mechanism of the kind described, the combination with a stationary valve casing provided with an annular valve seat forming a central chamber, and an annular suction chamber, means for connecting said suction chamber with a source of suction, and means for connecting said central chamber with a servo-motor between relatively movable members thereof, a diaphragm for engaging said seat to separate said chamber, and provided with air inlet apertures, a disc valve for engaging said diaphragm and closing said apertures, yielding resistance means for engaging said disc valve in a direction to hold the disc valve seated on the diaphragm and the diaphragm unseated, and hand operated means for varying the resistance of said yielding resistance means, said yielding resistance means being calibrated so that it will exert no material effective pressure on said disc valve when in fully released position, and when in fully compressed position it will exert sufficient pressure to nearly counterbalance the maximum differential of fluid pressures on the diaphragm and disc valve.

3. In valve mechanism of the kind described, the combination with a stationary valve casing provided with an annular valve seat forming a central chamber, and an annular suction chamber, means for connecting said suction chamber with a source of suction, and means for connecting said central chamber with a servo-motor between relatively movable members thereof, a diaphragm for engaging said seat to separate said chamber, and provided with air inlet apertures, a disc valve for engaging said diaphragm and closing said apertures, yielding resistance means for engaging said disc valve in a direction to hold the disc valve seated on the diaphragm and the diaphragm unseated, and hand operated means for varying the resistance of said yielding resistance means, said yielding resistance means being calibrated so that it will exert no material effective pressure on said disc valve when in fully released position, and when in fully compressed position it will exert sufficient pressure to nearly counterbalance the maximum differential of fluid pressures on the diaphragm and disc valve, said resistance varying means being provided with a part for positively holding the disc valve seated and the diaphragm unseated when the resistance means is under maximum compression.

4. In valve mechanism of the kind described, the combination with a stationary valve casing provided with an annular valve seat forming a central chamber and an annular suction chamber, means for connecting said suction chamber with a source of suction, and means for connecting said central chamber with a servo-motor between relatively movable members thereof, a diaphragm for engaging said seat to separate said charmbers, and provided with air inlet apertures, yielding resistance means for engaging said disc valve in a direction to hold the disc valve seated on the diaphragm and the diaphragm unseated, said yielding resistance means being calibrated so as to exert no material effective pressure on said disc valve when in fully released position, and to exert when fully compressed sufficient pressure to nearly counterbalance the maximum differential of fluid pressures on the diaphragm and disc valve, means for adjusting said yielding resistance means comprising a hand operated rotary cam, and an abutment part movable in the direction of the axis of said cam, and having cam engaging portions and means for holding said abutment part against rotation.

5. In valve mechanism of the kind described, the combination with a stationary valve casing provided with an annular valve seat forming a central chamber and an annular suction chamber, means for connecting said suction chamber with a source of suction, and means for connecting said central chamber with a servo-motor between relatively movable members thereof, a diaphragm for engaging said seat to separate said chamber, and provided with air inlet apertures, a disc valve for engaging said diaphragm and closing said apertures, yielding resistance means for engaging said disc valve in a direction to hold the disc valve seated on the diaphragm and the diaphragm unseated, said yielding resistance means being calibrated so as to exert no material effective pressure on said disc valve when in fully released position, and to exert when fully compressed sufficient pressure to nearly counterbalance the maximum differential of fluid pressures on the diaphragm and disc valve, means for adjusting said yielding resistance means comprising a hand operated rotary cam, and an abutment part movable in the direction of the axis of said cam, and having cam engaging portions and means for holding said abutment part against rotation, said abutment part being provided with a portion for engaging the disc valve to positively hold the disc valve seated and the diaphragm unseated when the resistance means is under maximum compression.

6. In valve mechanism of the kind described, the combination with a stationary valve casing formed of two members, one member being provided with air inlet apertures, a diaphragm valve having its marginal portions clamped between said casing members and being provided with air inlet apertures, the other casing member being provided with an annular diaphragm engaging seat forming when the diaphragm is seated a central chamber and a substantially annular suction chamber, and having means for connecting said central chamber with a servo-motor between relatively movable members thereof, and means for connecting said suction chamber with a source of suction, a disc valve in said central chamber adapted to seat on the diaphragm and close the air inlet apertures therein, a rotary cam within said central chamber, an abutment plate held against rotation and provided with cam engaging portions, a resistance spring interposed between said abutment plate and disc valve, said cam and abutment plate having engaged guiding means co-axial with the stem of the disc valve, and one of said parts having a guiding engagement with said stem, and a hand operated lever exterior to said casing operatively connected with said cam.

7. In valve mechanism of the kind described, the combination with a stationary valve casing formed of two members, one member being provided with air inlet apertures, a diaphragm valve having its marginal portions clamped between said casing members and being provided with air inlet apertures, the other casing member being provided with an annular diaphragm engaging seat forming when the diaphragm is seated a central chamber and a substantially annular suction chamber, and having means for connecting said central chamber with a servo-motor between relatively movable members thereof, and means for connecting said suction chamber with a source of suction, a disc valve in said central chamber adapted to seat on the diaphragm and close the air inlet apertures therein, a rotary cam within said central chamber, an abutment plate held against rotation and provided with cam engaging portions, a resistance spring interposed between said abutment plate and disc valve, said cam having a guiding portion engaging said stem and engaging guiding portions of said abutment plate, and a hand operated lever exterior to said casing and operatively connected with said cam.

8. In valve mechanism of the kind described, the combination with a stationary valve casing formed of two members, one member being provided with air inlet apertures, a diaphragm valve having its marginal portions clamped between said casing members and being provided with air inlet apertures, the other casing member being provided with an annular diaphragm engaging seat forming when the diaphragm is seated a central chamber and a substantially annular suction chamber, and having means for connecting said central chamber with a servo-motor between relatively movable members thereof, and means for connecting said suction chamber with a source of suction, a disc valve in said central chamber adapted to seat on the diaphragm and close the air inlet apertures therein, a rotary cam within said central chamber, an abutment plate held against rotation and provided with cam engaging portions, a resistance spring interposed between said abutment plate and disc valve, said cam and abutment plate having engaged guiding means co-axial with the stem of the disc valve, and one of said parts having a guiding engagement with said stem, and a hand operated lever exterior to said casing operatively connected with said cam, said first mentioned casing member being provided with a plate having annular portions for engaging the diaphragm in substantial alignment with said annular seat, and a spring weaker than said resistance spring engaging said plate for seating the diaphragm and holding the disc valve unseated when the resistance spring is in its fully released position.

9. In valve mechanism of the kind described, the combination with a stationary valve casing formed of two members, one member being provided with air inlet apertures, a diaphragm valve having its marginal portions clamped between said casing members and being provided with an annular diaphragm engaging seat forming when the diaphragm is seated a central chamber and a substantially annular suction chamber, and having means for connecting said central chamber with a servo-motor between relatively movable members thereof, and means for connecting said suction chamber with a source of suction, a disc valve in said central chamber adapted to seat on the diaphragm and close the air inlet apertures therein, a rotary cam within said central chamber, an abutment plate held against rotation and provided with cam engaging portions, a resistance spring interposed between said abutment plate and disc valve, said cam and abutment plate having engaged guiding means co-axial with the stem of the disc valve, and one of said parts having a guiding engagement with said stem, and a hand operated lever exterior to said casing operatively connected with said cam, said first mentioned casing member being provided with a plate having annular portions for engaging the diaphragm in substantial alignment with said annular seat, and a spring weaker than said resistance spring engaging said plate for seating the diaphragm and holding the disc valve unseated when the resistance spring is in its fully released position, said resistance spring being calibrated so as to exert no material effective pressure on the disc valve when in fully released position, and in fully compressed position to exert sufficient pressure to nearly counterbalance the maximum differential of fluid pressures on the diaphragm and disc valve.

10. In valve mechanism of the kind described, the combination with a stationary valve casing formed of two members, one member being provided with air inlet apertures, a diaphragm valve having its marginal portions clamped between said casing members and being provided with air inlet apertures, the other casing member being provided with an annular diaphragm engaging seat forming when the diaphragm is seated a central chamber and a substantially annular suction chamber, and having means for connecting said central chamber with a servo-motor between relatively movable members thereof, and means for connecting said suction chamber with a source of suction, a disc valve in said central chamber adapted to seat on the diaphragm and close the air inlet apertures therein, a rotary cam within said central chamber, an abutment plate held against rotation and provided with cam engaging portions, a resistance spring interposed between said abutment plate and disc valve, said cam and abutment plate having engaged guiding means co-axial with the stem of the disc valve, and one of said parts having a guiding engagement with said stem, and a hand operated lever exterior to said casing operatively connected with said cam, said hand lever and valve casing being provided with co-acting means for holding the hand lever in any position to which it may be moved.

In testimony whereof we affix our signatures.

CALEB S. BRAGG.
VICTOR W. KLIESRATH.